United States Patent
Fubuki

(10) Patent No.: US 9,257,881 B2
(45) Date of Patent: Feb. 9, 2016

(54) ROTATING ELECTRIC MACHINE

(71) Applicant: TOYOTA JIDOSHA KABUSHIKI KAISHA, Toyota, Aichi-ken (JP)

(72) Inventor: Shingo Fubuki, Nissin (JP)

(73) Assignee: Toyota Jodosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/318,798

(22) Filed: Jun. 30, 2014

(65) Prior Publication Data

US 2015/0008770 A1 Jan. 8, 2015

(30) Foreign Application Priority Data

Jul. 5, 2013 (JP) .................................. 2013-141974

(51) Int. Cl.
| | |
|---|---|
| *H02K 9/00* | (2006.01) |
| *H02K 9/19* | (2006.01) |
| *H02K 1/32* | (2006.01) |
| *H02K 5/18* | (2006.01) |
| *H02K 9/22* | (2006.01) |
| *H02K 3/24* | (2006.01) |
| *H02K 5/20* | (2006.01) |

(52) U.S. Cl.
CPC .................. *H02K 9/005* (2013.01); *H02K 1/32* (2013.01); *H02K 9/19* (2013.01); *H02K 3/24* (2013.01); *H02K 5/18* (2013.01); *H02K 5/20* (2013.01); *H02K 9/22* (2013.01)

(58) Field of Classification Search
CPC ............. H02K 3/24; H02K 5/18; H02K 5/20; H02K 9/005; H02K 9/19; H02K 9/22
USPC .................................. 310/54, 58, 64, 216.091
See application file for complete search history.

(56) References Cited

U.S. PATENT DOCUMENTS

| | | | | |
|---|---|---|---|---|
| 1,877,904 | A | * 9/1932 | Laffoon | H02K 3/24 310/63 |
| 3,110,827 | A | * 11/1963 | Baudry | H02K 3/22 310/55 |
| 4,250,418 | A | * 2/1981 | Eckels | 310/64 |
| 4,546,279 | A | * 10/1985 | Hammer et al. | 310/59 |

(Continued)

FOREIGN PATENT DOCUMENTS

| | | |
|---|---|---|
| JP | 56-149561 | 4/1955 |
| JP | 8-275421 | 10/1996 |

(Continued)

*Primary Examiner* — Joshua Benitez-Rosario
*Assistant Examiner* — Rashad Johnson
(74) *Attorney, Agent, or Firm* — Finnegan, Henderson, Farabow, Garrett & Dunner, L.L.P.

(57) ABSTRACT

A rotating electric machine includes a stator, a rotor, and a coolant supply passage. Coils are wound on the teeth of the stator. The rotor is disposed coaxially with the stator, and has an outer circumferential surface that faces respective distal end faces of the teeth with a constant gap formed therebetween. The coolant supply passage is disposed inside the rotor, and is configured to eject a coolant from a coolant outlet of the outer circumferential surface of the rotor toward the distal end face of a corresponding one of the teeth so as to supply the coolant to the gap. A discharge groove is formed in the distal end face of the corresponding tooth. The discharge groove is inclined radially outwardly of the stator, from a coolant supply position as an axial position of the stator facing the coolant outlet, toward one edge of the distal end face of the corresponding tooth.

7 Claims, 4 Drawing Sheets

(56) References Cited

U.S. PATENT DOCUMENTS

| | | | |
|---|---|---|---|
| 5,994,804 A * | 11/1999 | Grennan | H02K 1/32 310/58 |
| 6,710,479 B2 * | 3/2004 | Yoshida et al. | 310/52 |
| 7,952,240 B2 * | 5/2011 | Takenaka et al. | 310/54 |
| 8,198,770 B2 * | 6/2012 | Hassett | F16C 37/00 310/58 |
| 8,659,190 B2 * | 2/2014 | Chamberlin | H02K 1/32 310/52 |
| 2003/0030333 A1 * | 2/2003 | Johnsen | H02K 1/32 310/54 |
| 2004/0032172 A1 * | 2/2004 | Tong | 310/58 |
| 2006/0290225 A1 * | 12/2006 | Mipo et al. | 310/187 |
| 2007/0194638 A1 * | 8/2007 | Birdi et al. | 310/54 |
| 2009/0066183 A1 * | 3/2009 | Aramaki et al. | 310/217 |
| 2009/0140601 A1 * | 6/2009 | Tanaka et al. | 310/262 |
| 2011/0127862 A1 * | 6/2011 | Eichinger | H02K 1/20 310/61 |
| 2011/0210561 A1 * | 9/2011 | Calvo Madariaga | H02K 1/32 290/1 B |
| 2013/0076168 A1 * | 3/2013 | Memminger | H02K 5/20 310/54 |
| 2013/0300226 A1 * | 11/2013 | Tounosu | H02K 9/18 310/53 |
| 2013/0313928 A1 * | 11/2013 | McKinzie et al. | 310/54 |
| 2013/0334912 A1 * | 12/2013 | Tokunaga et al. | 310/54 |
| 2014/0175916 A1 * | 6/2014 | Chamberlin et al. | 310/54 |

FOREIGN PATENT DOCUMENTS

| | | |
|---|---|---|
| JP | 2006-67777 | 3/2006 |
| JP | 2011-125090 | 6/2011 |

* cited by examiner

ROTATING ELECTRIC MACHINE

INCORPORATION BY REFERENCE

The disclosure of Japanese Patent Application No, 2013-141974 filed on Jul. 5, 2013 including the specification, drawings and abstract is incorporated herein by reference in its entirety.

BACKGROUND OF THE INVENTION

1. Field of the Invention

The invention relates to a rotating electric machine, and in particular, to a rotating electric machine in which a coolant is supplied to a gap between the inner periphery of a stator and the outer periphery of a rotor so as to effect cooling.

2. Description of Related Art

Rotating electric machines are cooled since coils generate heat in operation. In a cooling structure for a rotating electric machine as disclosed in, for example, Japanese Patent Application Publication No, 2006-067777 (JP 2006-067777 A), a rotor is provided with slots formed in respective steel sheets of a laminated steel plate to be shifted in phase by 90 degrees in the circumferential direction, such that the slots form passages that extend in radial directions from a coolant passage formed inside a rotor shaft to the outer periphery of the rotor.

In a cooling structure for a motor, as disclosed in Japanese Patent Application Publication No. 2011-125090 (JP 2011-125090 A), protrusions or grooves that are angled relative to the rotational direction are formed at the outer periphery of a rotor, so that a cooling fluid between the rotor and a stator can easily flow toward axially end portions of the rotor.

In a rotor structure of a rotating electric machine, as disclosed in Japanese Patent Application Publication No. 8-275421 (JP 8-275421 A), helical grooves are formed in the outer periphery of a rotor, so as to produce cooling wind using the centrifugal force generated during rotation.

SUMMARY OF THE INVENTION

In the case where the rotating electric machine is cooled by the method of supplying the coolant to the gap between the inner periphery of the stator and the outer periphery of the rotor, as described in JP 2006-067777 A, if the coolant remains in the gap, which is a small clearance, the drag friction is increased during rotation of the rotor, resulting in an increase of a loss. It is thus desirable to prevent the coolant from remaining or stagnating in the gap.

The invention provides a rotating electric machine that can be efficiently cooled, with a coolant that is less likely or unlikely to remain in a gap between the inner periphery of a stator and the outer periphery of a rotor. The invention also provides a rotating electric machine that can reduce a drag loss during rotation of the rotor, by making the coolant less likely or unlikely to remain in the gap between the inner periphery of the stator and the outer periphery of the rotor.

A rotating electric machine according to one aspect of the invention includes a plurality of coils, a stator, a rotor, and a coolant supply passage. The stator has a plurality of teeth, the plurality of coils are wound on the teeth. The rotor is disposed coaxially with the stator, The rotor has an outer circumferential surface that faces respective distal end faces of the teeth with a constant gap between the rotor and the distal end faces. The coolant supply passage is disposed inside the rotor. The coolant supply passage is configured to eject a coolant from a coolant outlet of the outer circumferential surface of the rotor toward the distal end face of a corresponding one of the teeth so as to supply the coolant to the gap. The corresponding one of the teeth has a discharge groove on the distal end face of the corresponding one of the teeth, the discharge groove has a predetermined width. The discharge groove is inclined radially outwardly of the stator, from a coolant supply position that is an axial position of the stator facing the coolant outlet, toward one edge of the distal end face of the corresponding tooth.

In the rotating electric machine as described above, the discharge groove may include a circumferentially inclined groove that is inclined radially outwardly of the stator from the coolant supply position in a circumferential direction of the stator.

In the rotating electric machine as described above, the circumferentially inclined groove may be inclined radially outwardly of the stator from a center of the coolant supply position in the circumferential direction, toward circumferentially opposite edges of the distal end face of the corresponding tooth.

In the rotating electric machine as described above, the discharge groove may include an axially inclined groove that is inclined radially outwardly of the stator, in an axial direction of the stator, from the coolant supply position of the distal end face of the corresponding tooth, toward one of coil ends of the plurality of coils.

In the rotating electric machine as described above, the axially inclined groove may be inclined radially outwardly of the stator, from a center of the coolant supply position in the axial direction, toward one of the coil ends located at one of axially opposite edges of the distal end face of the corresponding tooth, and may be inclined radially outwardly of the stator, from the center of the coolant supply position in the axial direction, toward the other coil end located at the other of the axially opposite edges of the distal end face.

In the rotating electric machine as described above, the circumferentially inclined groove may be inclined radially outwardly of the stator from the coolant supply position toward one of circumferentially opposite edges of the distal end face of the corresponding tooth, and the rotor may be configured to rotate in a direction from the other of the circumferentially opposite edges toward the one of the circumferentially opposite edges.

With the rotating electric machine constructed as described above, the discharge groove that is inclined from the coolant supply position as the axial position opposed to the coolant outlet of the outer circumferential surface of the rotor toward one edge of the distal end face of the corresponding tooth is provided in the distal end face of the tooth. With this arrangement, the coolant is less likely or unlikely to remain in the gap between the inner periphery of the stator and the outer periphery of the rotor. Accordingly, the rotating electric machine can be cooled with improved efficiency, and the drag loss that would be caused by the coolant during rotation of the rotor can be reduced. Also, since the discharge groove is formed with a given width to extend from the coolant supply position toward the outer edge of the distal end face of the tooth, deterioration of the motor performance due to the provision of the groove can be minimized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
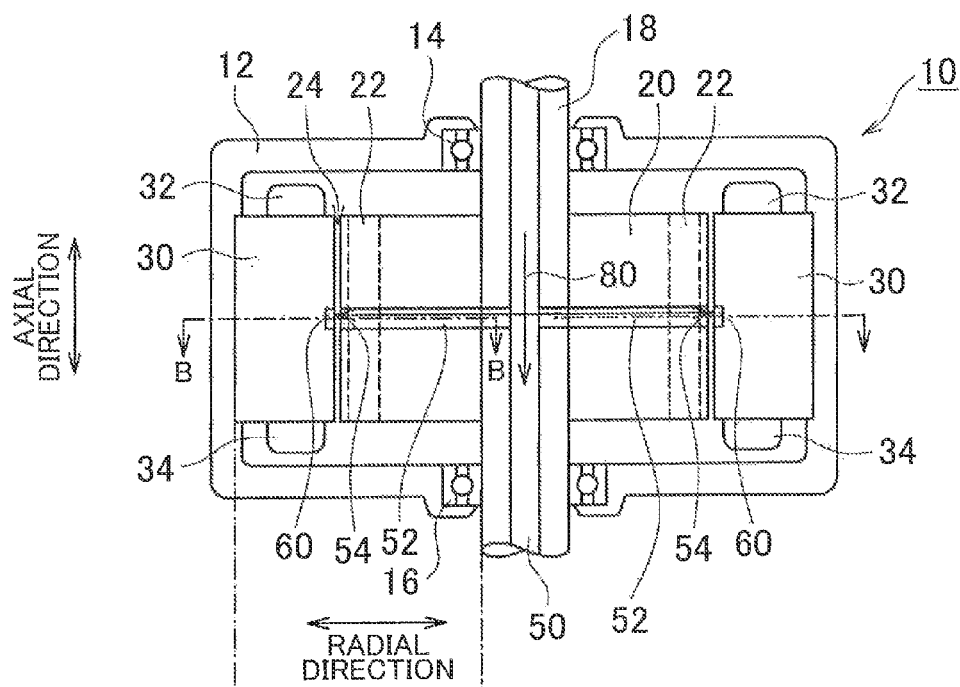
FIG. 1A is an overall cross-sectional view of a rotating electric machine according to one embodiment of the invention.

One embodiment of the invention will be described in detail with reference to the drawings. While a rotating electric machine installed on a vehicle will be hereinafter described, this is a mere example for illustrative purposes, and the rotating electric machine of the invention may find other application provided that it is cooled by a coolant. A method of arranging a coolant passage in a rotor, and the shape and number of turns of a coil wound on each of teeth of a stator will be described below for illustrative purposes only, and may be changed as needed in accordance with the specifications of the rotating electric machine. In the following description, the same reference numerals are assigned to the same or similar elements in all of the drawings, and these elements will not be repeatedly described.

Figure 1B:
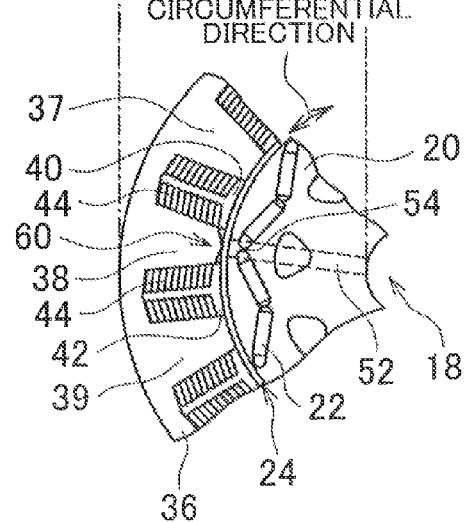
FIG. 1B is a cross-sectional view taken along line B-B in FIG. 1A.

FIG. 1A and FIG. 1B are cross-sectional views of a rotating electric machine 10. Specifically, FIG. 1A is an overall cross-sectional view of the rotating electric machine 10, and FIG. 1B is a cross-sectional view taken along line B-B in FIG. 1A.

The rotating electric machine 10 is a three-phase synchronous motor-generator installed on a vehicle. The rotating electric machine 10 includes a rotor 20 fixed integrally to a rotary shaft 18 supported by bearings 14, and a stator 30 fixed at its outer periphery and supported by a motor case 12. In the rotating electric machine 10, a coolant is supplied from a coolant supply conduit 50 formed inside the rotor 20, to a gap 24 between the inner periphery of the stator 30 and the outer periphery of the rotor 20, so as to effect cooling.

The rotor 20 is an annular magnetic component formed by laminating a plurality of steel sheets formed in a certain shape. Instead of using a laminate of electromagnetic steel sheets, magnetic powder may be molded into an integral body. Permanent magnets 22 are disposed at given positions in a radially outer portion of the rotor 20, to form magnetic poles of the rotor 20. In operation, certain current is applied to coils wound on the stator 30 so as to generate rotating magnetic fields. The permanent magnets 22 cooperate with the rotating magnetic fields to produce torque, with which the rotor 20 rotates the rotary shaft 18 integrated with the rotor 20.

The stator 30 includes an annular stator core 36, a plurality of teeth 37, 38, 39 formed on the radially inner side of the stator core 36 to be arranged in the circumferential direction, a plurality of slots 40, 42 as spaces between adjacent ones of the teeth, and coils 44 inserted in the slots 40, 42 and wound on the teeth 37, 38, 39. The stator core 36 is an annular magnetic component formed by laminating a plurality of steel sheets formed in a certain shape. Coil ends 32, 34 are portions of the coils 44 wound on the teeth 37, 38, 39, which portions protrude from axially opposite ends of the stator core 36. In FIGS. 1A and 1B, the axial direction, radial direction, and circumferential direction of the rotary electric machine 10 are indicated.

The coolant supply conduit 50 is a passage formed inside the rotary shaft 18. In operation, a coolant 80 supplied from a coolant circulation system (not shown) flows through the coolant supply conduit 50. As the coolant 80, ATF (Automatic Transmission Fluid) used for lubricating and cooling a transmission, etc. of the vehicle is used. Coolants, such as LLC (Long Life Coolant), other than the AFT, may also be used.

Coolant supply passages 52, which branch off from the coolant supply conduit 50, extend radially outward in the interior of the rotor 20, to the outer periphery of the rotor 20. The coolant supply passages 52 have coolant outlets 54 as openings that are open to the outer circumferential surface of the rotor 20, In operation, the coolant 80 is ejected from the coolant outlets 54 toward distal end faces of the teeth 37, 38, 39 of the stator 30, so as to be supplied to the gap 24.

A coolant receiving portion 60 is formed at a distal end face of each of the teeth 37, 38, 39 that are opposed to the coolant outlets 54 of the rotor 20. The coolant receiving portion 60 is located at a coolant supply position as an axial position of the tooth opposed to the corresponding coolant outlet 54.

Figure 2:
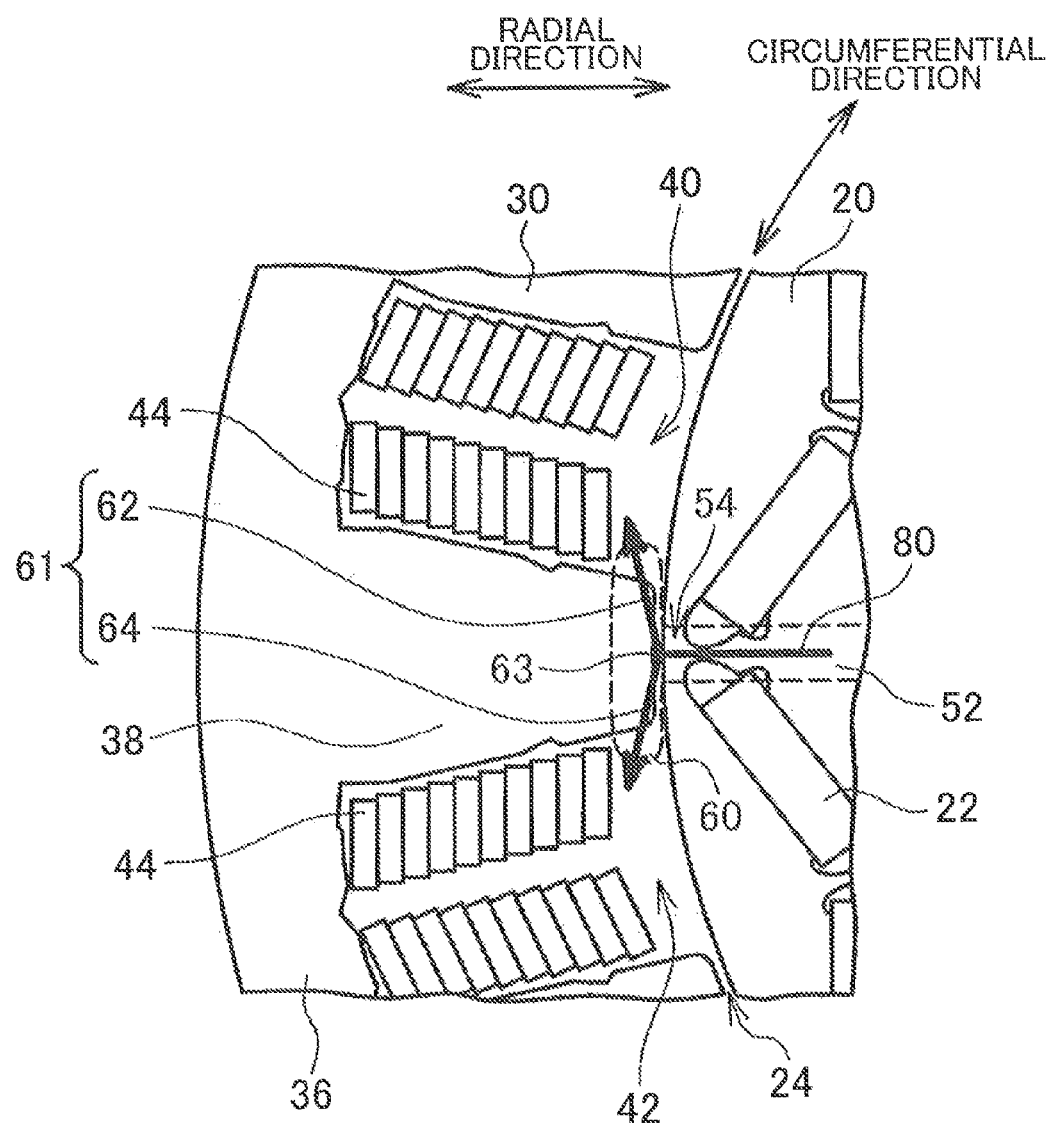
FIG. 2 is an enlarged view of FIG. 1B.

FIG. 2 is a partially enlarged view in which a portion surrounding the tooth 38 shown in FIG. 1B is enlarged. As shown in FIG. 2, the coolant receiving portion 60 is provided with an inclined discharge groove 61 formed in the circumferential direction so as to discharge the coolant 80. The inclined discharge groove 61 having a given width is inclined (radially outwardly of the stator 30) from the coolant supply position, in directions toward an outer edge (in the embodiment of FIG. 2, circumferentially opposite outer edges) of the distal end face of the tooth 38. In the embodiment of FIG. 2, the directions toward the circumferentially opposite outer edges of the distal end face of the tooth 38 are directions toward the slots 40, 42 located adjacent to the tooth 38. The inclined discharge groove 61 has circumferentially inclined faces 62, 64 that are inclined (radially outwardly of the stator 30) from a center position 63 provided as a top along the circumferential direction at the coolant supply position, toward the circumferentially opposite edges of the distal end face of the tooth 38, respectively. Thus, the inclined discharge groove 61 is a both-side inclined discharge groove inclined from the center position 63 to the circumferentially opposite edges. While the circumferentially inclined faces 62, 64 shown in FIG. 2 are inclined flat faces, they may be inclined curved faces that are shaped so that the coolant 80 can be easily discharged.

With the inclined discharge groove 61 having the circumferentially inclined faces 62, 64 thus provided at the coolant receiving portion 60, the coolant 80 ejected from the coolant supply passage 52 via the coolant outlet 54 and supplied to the gap 24 can flow into the slots 40, 42, without remaining in the gap 24 that is a narrow clearance. Accordingly, a drag loss caused by the coolant 80 during rotation of the rotor 20 can be reduced. In particular, the flow of the coolant 80 as described above is effectively formed by rotation of the rotor 20.

Figure 3:
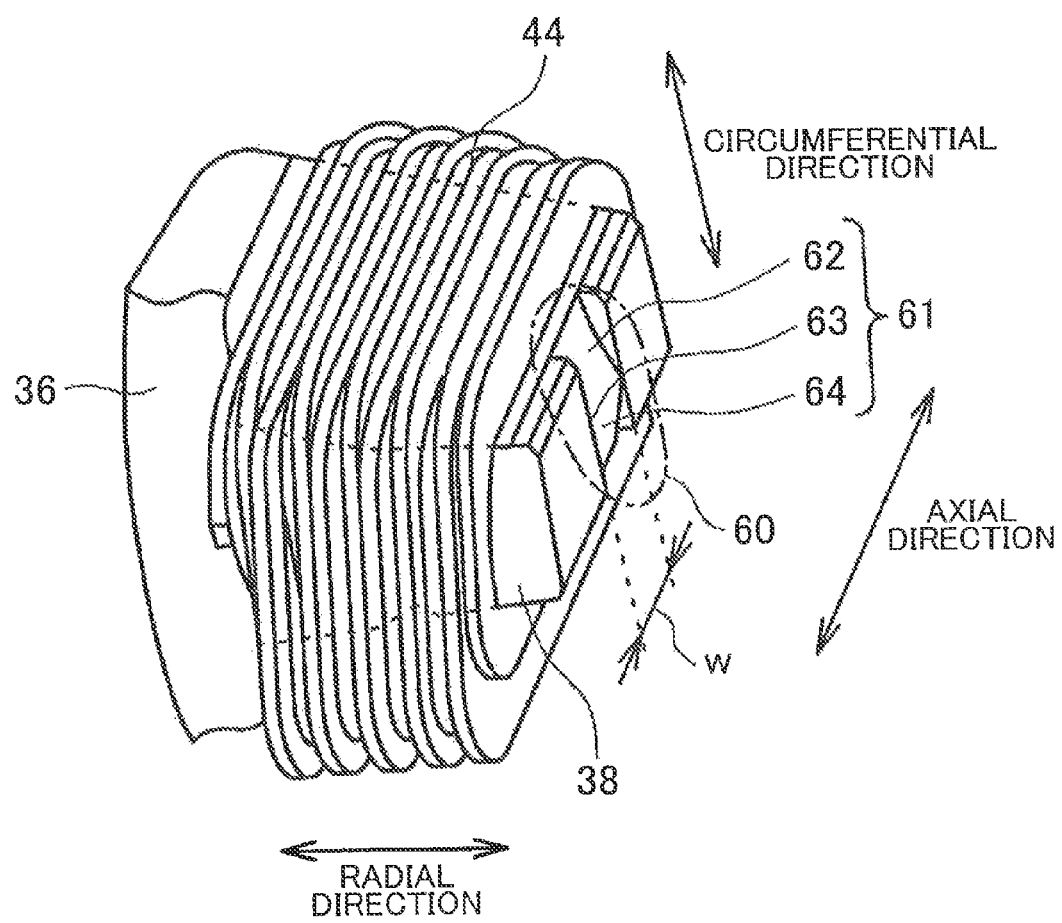
FIG. 3 is a perspective view of a tooth of a stator of the rotating electric machine according to the embodiment of FIG. 1.

FIG. 3 is a perspective view of the tooth 38 of the stator 30. As shown in FIG. 3, the inclined discharge groove 61 having the circumferentially inclined faces 62, 64 is limited to a narrow range of the distal end face of the tooth 38 in terms of the axial direction and the radial direction. In the embodiment of FIG. 3, the radial dimension of the inclined discharge groove 61 is limited to a distal end portion of the tooth 38, more specifically, to a portion that protrudes from a portion of the tooth 38 on which the coil 44 is wound. Also, the groove width W as the axial dimension of the inclined discharge groove 61 is set to be several times smaller than the axial dimension of the distal end face of the tooth 38.

Thus, the inclined discharge groove 61 having the circumferentially inclined faces 62, 64 is provided in the limited range, in the distal end face of the tooth 38 as a magnetic body, whereby an influence of the groove 61 on magnetic characteristics of the tooth 38 can be minimized. As a result, reduction of the performance of the rotating electric machine 10, which would be otherwise caused by provision of the inclined discharge groove 61, can be minimized.

Figure 4A:
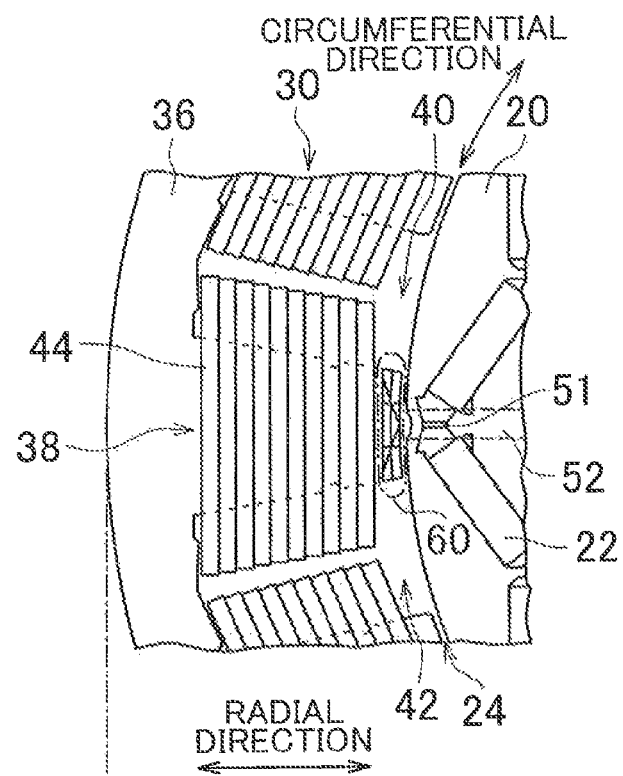
FIG. 4A is a top view corresponding to FIG. 2, showing another arrangement for preventing coolant from remaining in a gap between a rotor and a stator.
Figure 4B:
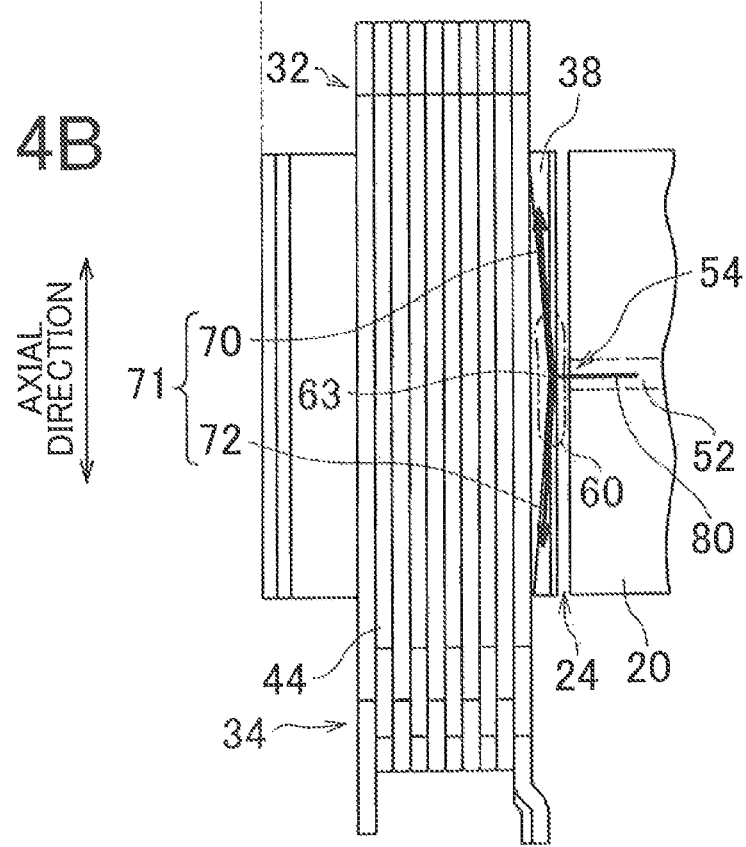
FIG. 4B is a side view showing a portion of one tooth in the arrangement of FIG. 4A.

While the coolant 80 ejected to the coolant receiving portion 60 is caused to flow in the circumferential direction of the tooth 38 without remaining in the gap 24 in the above-described embodiment, the coolant 80 may be caused to flow in the axial direction of the teeth 38 as well as the circumferential direction. FIGS. 4A and 4B illustrate an arrangement in which an axially inclined discharge groove 71 is provided which extends from the coolant receiving portion 60 of the distal end face of the tooth 38 in the axial direction of the stator 30. The axially inclined discharge groove 71, which has a given width, is inclined (radially outwardly of the stator 30) toward the coil ends 32, 34. FIG. 4A, which corresponds to FIG. 2, is a top view of the rotor 20 and the stator 30 as viewed from the axially upper side thereof. FIG. 4B is a side view of one tooth 38, which shows the coil ends 37, 34.

In the arrangement of FIG. 4, the axially inclined discharge groove 71 has axially inclined faces 70, 72 that are inclined from the coolant receiving portion 60 of the distal end face of the tooth 38 toward the coil ends 32, 34, in the axial direction of the stator 30. The axially inclined faces 70, 72 are inclined (radially outwardly of the stator 30) from the center position 63 provided as a top along the axial direction at the coolant supply position, toward the coil ends 32, 34 as the axially opposite ends of the distal end face of the tooth 38, respectively. Thus, the axially inclined discharge groove 71 is a both-side inclined discharge groove that is inclined in a tapered shape from the center position 63 to the opposite sides in the axial direction.

As shown in FIG. 4B, the axially inclined discharge groove 71 having the axially inclined faces 70, 72 is limited to a narrow range in terms of the radial direction of the distal end face of the tooth 38. Namely, the radial dimension of the axially inclined faces 70, 72 is limited to that of a distal end portion of the tooth 38, more specifically, a portion of the tooth 38 which protrudes from a portion on which the coil 44 is wound. Although not illustrated in FIG. 4, the groove width as the circumferential dimension of the axially inclined discharge groove 70 is set to be several times smaller than the circumferential dimension of the distal end portion of the tooth 38.

With the axially inclined discharge groove 71 having the axially inclined faces 70, 72 thus provided in the distal end face of the tooth 38 to extend from the coolant receiving portion 60, the coolant 80 ejected from the coolant supply passage 52 via the coolant outlet 54 and supplied to the gap 24 can flow toward the coil ends 32, 34 without remaining in the gap 24 that is a narrow clearance. In this manner, the coil ends 32, 34 can be cooled, too.

In the above description, each of the circumferentially inclined groove and the axially inclined groove has both-side inclined faces that are inclined to the opposite sides from the center position that extends along the axial direction of the coolant supply position. However, the circumferentially or axially inclined groove may have a one-side inclined face. For example, the groove may have both-side include faces in the case where the rotating electric machine rotates in the forward and reverse directions, and the groove may have a one-side inclined face in the case where the rotating electric machine rotates in a predetermined one rotational direction. In the latter case, the inclined face is preferably inclined toward the downstream side of the rotational direction. Also, while the axially inclined faces are provided in addition to the circumferentially inclined faces in the arrangement of FIGS. 4A and 4B, the axially inclined faces may be provided alone.

What is claimed is:

1. A rotating electric machine comprising:
   a plurality of coils;
   a stator having a plurality of teeth, the plurality of coils wound on the teeth;
   a rotor disposed coaxially with the stator, the rotor having an outer circumferential surface that faces respective distal end faces of the teeth with a constant gap between the rotor and the distal end faces; and
   a coolant supply passage disposed inside the rotor,
   the coolant supply passage configured to eject a coolant from a coolant outlet of the outer circumferential surface of the rotor toward the distal end face of a corresponding one of the teeth so as to supply the coolant to the gap,
   the corresponding one of the teeth having a discharge groove on the distal end face of the corresponding one of the teeth,
   the discharge groove having a predetermined width, and
   the discharge groove inclined radially outwardly of the stator, from a coolant supply position that is an axial position of the stator facing the coolant outlet, toward one edge of the distal end face of the corresponding tooth.

2. The rotating electric machine according to claim 1, wherein
   the discharge groove includes a circumferentially inclined groove that is inclined radially outwardly of the stator from the coolant supply position in a circumferential direction of the stator.

3. The rotating electric machine according to claim 2, wherein
   the circumferentially inclined groove is inclined radially outwardly of the stator from a center of the coolant supply position in the circumferential direction toward circumferentially opposite edges of the distal end face of the corresponding tooth.

4. The rotating electric machine according to claim 1, wherein
   the discharge groove includes an axially inclined groove that is inclined radially outwardly of the stator, in an axial direction of the stator, from the coolant supply position of the distal end face of the corresponding tooth, toward one of coil ends of the plurality of coils.

5. The rotating electric machine according to claim 4, wherein
   the axially inclined groove is inclined radially outwardly of the stator, from a center of the coolant supply position in the axial direction, toward one of the coil ends located at one of axially opposite edges of the distal end face of the corresponding tooth, and is inclined radially outwardly of the stator, from the center of the coolant supply position in the axial direction, toward the other coil end located at the other of the axially opposite edges of the distal end face.

6. The rotating electric machine according to claim 2, wherein
   the circumferentially inclined groove is inclined radially outwardly of the stator from the coolant supply position toward one of circumferentially opposite edges of the distal end face of the corresponding tooth, and the rotor is configured to rotate in a direction from the other of the circumferentially opposite edges toward the one of the circumferentially opposite edges.

7. The rotating electric machine according to claim 2, wherein the circumferentially inclined groove is inclined radially outwardly of the stator from the coolant supply position toward one of circumferentially opposite edges of the distal end face of the corresponding tooth.

* * * * *